(12) United States Patent
Nakamura

(10) Patent No.: US 7,570,294 B2
(45) Date of Patent: Aug. 4, 2009

(54) DIGITAL CAMERA

(75) Inventor: Mitsumi Nakamura, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 292 days.

(21) Appl. No.: 11/582,483

(22) Filed: Oct. 18, 2006

(65) Prior Publication Data

US 2007/0086765 A1    Apr. 19, 2007

(30) Foreign Application Priority Data

Oct. 19, 2005    (JP)    ............................. 2005-304749

(51) Int. Cl.
*H04N 5/222*    (2006.01)
*G03B 17/20*    (2006.01)

(52) U.S. Cl. ............................ 348/333.04; 348/333.01; 348/333.02; 396/296

(58) Field of Classification Search ........................ 348/333.01–333.13; 396/296
See application file for complete search history.

(56) References Cited

U.S. PATENT DOCUMENTS

| | | | | |
|---|---|---|---|---|
| 5,235,374 A | * | 8/1993 | Kobayashi et al. | ............. 396/80 |
| 5,363,164 A | * | 11/1994 | Kobayashi et al. | ............. 396/77 |
| 5,467,162 A | * | 11/1995 | Goo | .............................. 396/98 |
| 5,583,602 A | * | 12/1996 | Yamamoto | ................... 396/133 |
| 5,848,303 A | * | 12/1998 | Jeong et al. | .................... 396/65 |
| 6,192,198 B1 | * | 2/2001 | Kitani et al. | ................... 396/50 |
| 6,535,248 B1 | * | 3/2003 | Hatakeyama | .......... 348/333.09 |
| 7,286,160 B2 | * | 10/2007 | Ejima et al. | .............. 348/207.2 |
| 2003/0071911 A1 | * | 4/2003 | Shinohara et al. | ............ 348/370 |
| 2003/0197804 A1 | * | 10/2003 | Ito | .............................. 348/345 |
| 2005/0140803 A1 | * | 6/2005 | Ohtsuka et al. | ............. 348/239 |

FOREIGN PATENT DOCUMENTS

| | | |
|---|---|---|
| JP | 2003-241069 A | 8/2003 |
| JP | 2003-344891 A | 12/2003 |

* cited by examiner

*Primary Examiner*—David L Ometz
*Assistant Examiner*—Richard M Bemben
(74) *Attorney, Agent, or Firm*—Sughrue Mion, PLLC

(57) ABSTRACT

A digital camera which has a plurality of modes including shooting mode and enables shooting, when the shooting mode is selected, in macro shooting mode or other shooting modes, comprising:
a subject decision device which decides whether a shooting screen includes a subject which cannot be properly photographed in the macro shooting mode,
a macro shooting mode decision device which decides whether the macro shooting mode is selected or not, and
a macro shooting mode canceling device which cancels the macro shooting mode when the subject decision device decides that the shooting screen includes a subject which cannot be properly photographed in the macro shooting mode and the macro shooting mode decision device decides that the macro shooting mode is selected.

16 Claims, 3 Drawing Sheets

DIGITAL CAMERA

BACKGROUND OF THE INVENTION

1. Field of the Invention

The present invention relates to a digital camera and particularly relates to a technique for reducing shooting mistakes in macro shooting mode of a digital camera which enables shooting in macro shooting mode.

2. Description of the Related Art

Conventionally, as a technique for reducing shooting mistakes in macro shooting mode of a digital camera which enables shooting in macro shooting mode, an imaging device is proposed which measures a distance to a subject and displays, when the measured distance is within a normal area, a warning to switch to normal shooting mode (Japanese Patent Application Laid-Open No. 2003-241069).

However, a distance to the subject may not be correctly measured in some environments and so on between the camera and the subject (due to diffused reflection or the like). According to the conventional imaging device, a distance to the subject is measured and a warning to switch to normal shooting mode is displayed when the measured distance is within the normal area, so that the warning may become unsuitable.

In another technique relating to the present invention, a subject and a shooting scene are recognized and the most suitable shooting mode is automatically set from a plurality of shooting modes, which allows a photographer having no special knowledge about shooting to take a good picture suitable for the subject and the scene (Japanese Patent Application Laid-Open No. 2003-344891). However, this conventional technique does not referred to any specific configurations for reducing shooting mistakes in macro shooting mode.

SUMMARY OF THE INVENTION

It is an object of the present invention to provide a technique for reducing shooting mistakes in macro shooting mode without measuring a distance to a subject in a digital camera which enables shooting in macro shooting mode.

The present invention is designed to solve the problem and configured as follows:

A digital camera which has a plurality of modes including shooting mode and enables shooting, when the shooting mode is selected, in macro shooting mode or other shooting modes, the digital camera comprising: a subject decision device which decides whether a shooting screen includes a subject which cannot be properly photographed in the macro shooting mode, a macro shooting mode decision device which decides whether the macro shooting mode is selected or not, and a macro shooting mode canceling device which cancels the macro shooting mode when the subject decision device decides that the shooting screen includes a subject which cannot be properly photographed in the macro shooting mode and the macro shooting mode decision device decides that the macro shooting mode is selected.

According to the present invention, it is decided whether the shooting screen (an image to be photographed, generally corresponding to an area visually recognized through a finder) includes a subject (a human face and so on) which cannot be properly photographed in macro shooting mode. When the shooting screen includes a subject which cannot be properly photographed in macro shooting mode and macro shooting mode is selected, macro shooting mode is canceled. In other words, macro shooting mode is controlled based on an image processing result.

Therefore, unlike the prior art for measuring a distance to a subject, it is possible to prevent or reducing mistakes of shooting in macro shooting mode a subject which cannot be properly photographed in macro shooting mode. In other words, it is possible to prevent or reducing shooting mistakes in macro shooting mode.

In the digital camera, for example, the macro shooting mode canceling device selects a mode other than the macro shooting mode as cancellation of the macro shooting mode.

Since a mode other than macro shooting mode is selected as cancellation of macro shooting mode, it is possible to prevent or reduce mistakes of shooting in macro shooting mode a subject which cannot be properly photographed in macro shooting mode. In other words, it is possible to prevent or reducing shooting mistakes in macro shooting mode.

The digital camera further comprises a storage device which stores data having been set in the macro shooting mode before cancellation of the macro shooting mode.

With this processing, when returning to macro shooting mode after cancellation of macro shooting mode, the stored data can be set again. It is thus possible to return to the same conditions as macro shooting mode before cancellation.

In the digital camera, for example, the macro shooting mode canceling device further provides, as cancellation of the macro shooting mode, notification that the macro shooting mode has been canceled.

With this processing, the notification that macro shooting mode has been canceled allows the user to immediately recognize the cancellation of the macro shooting mode.

In the digital camera, for example, the mode other than the macro shooting mode is standard shooting mode.

Standard shooting mode is an example of a mode other than the macro shooting mode. With this processing, standard shooting mode other than macro shooting mode is selected as cancellation of macro shooting mode and thus it is possible to prevent or reducing mistakes of shooting in macro shooting mode a subject which cannot be properly photographed in macro shooting mode. In other words, it is possible to prevent or reduce shooting mistakes in macro shooting mode. Additionally, when the shooting screen includes a subject which cannot be properly photographed in macro shooting mode (and the macro shooting mode is selected), standard shooting mode is immediately selected, enabling quick shooting properly in standard shooting mode. Thus standard shooting mode is selected without missing the best moment to take a good picture. A mode other than macro shooting mode of the present invention is not limited to standard shooting mode.

The digital camera further comprises a macro shooting mode returning device which enables a return to the macro shooting mode, for example, when it is decided that the shooting screen does not include a subject which cannot be properly photographed in the macro shooting mode after cancellation of the macro shooting mode.

With this processing, when it is decided that the shooting screen does not include a subject which cannot be properly photographed in macro shooting mode, the macro shooting mode returning device immediately makes a return to macro shooting mode, enabling quick shooting properly in macro shooting mode. Thus macro shooting mode is selected without missing the best moment to take a good picture.

In the digital camera, for example, the macro shooting mode returning device sets the stored data and selects the macro shooting mode as a return to the macro shooting mode.

With this processing, when returning to macro shooting mode after cancellation of macro shooting mode, the stored data can be set again and it is thus possible to return to the same conditions as macro shooting mode before cancellation.

In the digital camera, for example, the subject decision device starts deciding, when the shooting mode is selected, whether the shooting screen includes a subject which cannot be properly photographed in the macro shooting mode.

This timing is an example of the start time of the decision of the subject decision device. Thus the decision of the subject decision device can be started beforehand, enabling quick cancellation of macro shooting mode. The start time of the decision of the subject decision device according to the present invention is not limited to the time when shooting mode is selected. For example, the decision may be started when a switch is manually turned on.

In the digital camera, for example, the subject decision device is a face decision device which decides whether the shooting screen includes a human face as a subject which cannot be properly photographed in the macro shooting mode.

The human face is an example of a subject which cannot be properly photographed. A subject which cannot be properly photographed in the present invention is not limited to a human face. For example, generally a subject which cannot be supposed (by the user) to be photographed in macro shooting mode (for example, a building, an automobile, a train, and an animal) may be applicable.

According to the present invention, in a digital camera enabling shooting in macro shooting mode, it is possible to prevent or reduce shooting mistakes in macro shooting mode without measuring a distance to a subject.

DETAILED DESCRIPTION OF THE PREFERRED EMBODIMENTS

A digital camera which is an embodiment of the present invention will be described below in accordance with the accompanying drawings.

Figure 1:
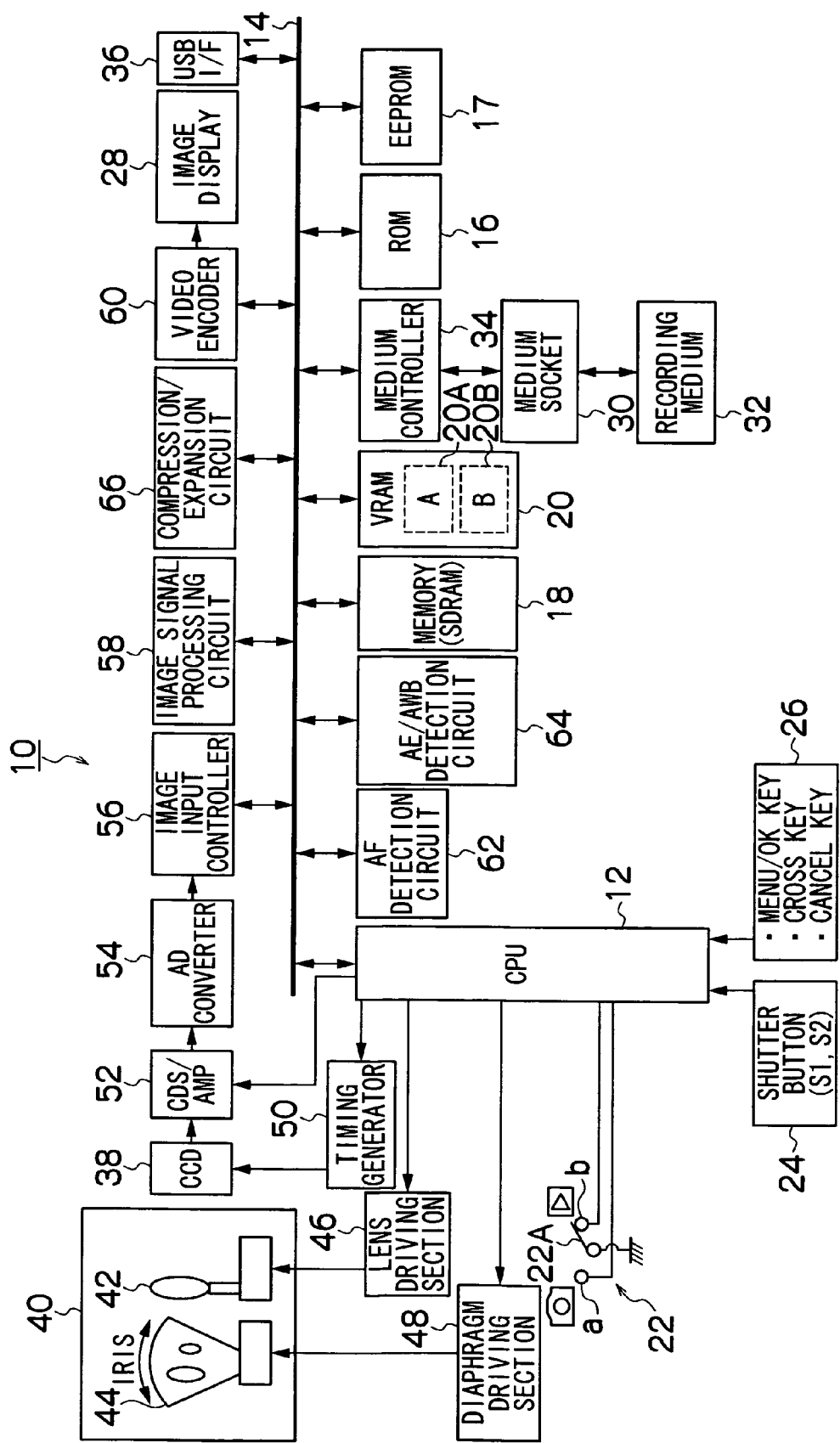
FIG. 1 is a block diagram showing the hardware configuration of a digital camera according to an embodiment of the present invention.

FIG. 1 is a block diagram for explaining the hardware configuration of the digital camera which is an embodiment of the present invention.

A digital camera 10 has a plurality of modes including shooting mode (for example, shooting mode and playback mode which can be selected by a mode selection switch 2). When shooting mode is selected, the digital camera 10 enables shooting in macro shooting mode or other shooting modes (for example, standard shooting mode).

The digital camera 10 has the function of recording and reproducing a still image and a moving image. The overall operations of the digital camera 10 are controlled by a central processing unit (CPU) 12. The CPU 12 acts as a control device which controls a camera system according to a predetermined program and also acts as an arithmetic device which performs various operations such as autoexposure (AE), autofocus (AF), and white balance (WB) adjustment.

Programs run by the CPU 12 and various kinds of data for control are stored in ROM 16 which is connected to the CPU 12 via a bus 14. CCD pixel defect information, various constant/information about camera operations, and so on are stored in EEPROM 17.

Memory (SDRAM) 18 is used as an expansion area of the program and an arithmetic area of the CPU 12 and also used as a temporary storage area of image data and audio data. VRAM 20 is temporary memory specific for image data and includes A area 20A and B area 20B. The memory 18 and the VRAM 20 can be shared.

The camera 10 includes a mode selection switch 22, a shutter button 24, and an operation device 26 including a menu/OK key, a cross key, and a cancel key. Signals from the various operation sections (22 to 26) are inputted to the CPU 12, and the CPU 12 controls the circuits of the camera 10 based on the inputted signals. For example, the CPU 12 performs lens driving control, shooting control, image processing control, image data recording/reproduction control, display control of an image display 28, and so on.

The mode selection switch 22 is an operation device for switching between shooting mode and playback mode. When the mode selection switch 22 is operated to connect a movable contact piece 22A to contact a, the signal is inputted to the CPU 12 and shooting mode is selected (or set) in the camera 10. When the movable contact piece 22A is connected to contact b, playback mode for reproducing recorded images is selected in the camera 10.

In the digital camera 10, when shooting mode is selected, macro shooting mode (one or more modes such as macro mode or super macro mode) or standard shooting mode (corresponding to the other shooting mode of the present invention) is selected (for example, selected by the operation device 26) and then shooting is enabled. When macro shooting mode is selected, the screen of the image display 28 indicates that macro shooting mode is selected (for example, with a flower mark). This display is continued while macro shooting mode is selected.

Macro shooting mode is a mode selected in close-up photography, that is, when shooting a subject at quite a short distance (generally at about 30 cm, varying with models). Standard shooting mode is a mode selected when shooting a subject between a close-range view (generally about 50 cm to 1 m, varying with models) and infinity.

The shutter button 24 is an operation button for inputting an instruction to start shooting. The shutter button 24 includes a two-stroke switch having an S1 switch turned on for half press and an S2 switch turned on for full press.

The menu/OK key is an operation key which has the function of a menu button for instructing the screen of the image display 28 to display a menu and the function of an OK button for providing instructions to confirm and execute selected contents. The cross key is an operation part for inputting instructions in four direction of up and down and left and right, and acts as a button (cursor moving device) for providing instructions to select items from a menu screen and select various setting items from each menu. The up/down key of the cross key acts as a zoom switch during shooting or a playback zoom switch during playback. The left/right key acts as a frame advance (forward/backward) button in playback mode. The cancel key is used for erasing a desired target such as a selected item and canceling the contents of instruction, or returning to the previous operation state.

The image display 28 is made up of a liquid crystal display enabling color display. The image display 28 can be used as an electronic finder for confirming an angle of view during shooting and used as a device for reproducing and displaying a recorded image. The image display 28 is also used as a display screen for a user interface. Information including menu information, selected items, and setting contents is displayed on the image display 28 when necessary. Instead of the liquid crystal display, a display (display device) using other systems such as an organic EL display may be used.

The digital camera 10 has a medium socket (medium loading part) 30 in which a recording medium 32 can be loaded. The format of the recording medium is not particularly limited and thus various media can be used which include xD-PictureCard (trademark), a semiconductor memory card typified by SmartMedia (trademark), a portable and compact hard disk, a magnetic disk, an optical disk, and a magneto-optical disk.

A medium controller 34 performs necessary signal conversion to pass input/output signals suitable for the recording medium 32 loaded in the medium socket 30.

Further, the camera 10 includes a USB interface 36 as a communication device for making connections to a personal computer and other external devices. The camera 10 and an external device are connected to each other via a USB cable (not shown), so that data can pass between the camera 10 and the external device. The communication mode is not, as a matter of course, limited to USB. IEEE 1394, Bluetooth, and other communication modes may be used.

The shooting function of the digital camera 10 will be described below.

When shooting mode is selected by the mode selection switch 22, power is supplied to a shooting section including a color CCD solid-state image sensing device (hereinafter, will be referred to as a CCD) 38, so that shooting can be performed.

A lens unit 40 is an optical unit which includes a photographic lens 42 such as a focus lens and a mechanical shutter 44 used also as a diaphragm. The lens unit 40 is motor driven by a lens driving section 46 and a diaphragm driving section 48 which are controlled by the CPU 12, so that zoom control, focus control, and iris control are performed.

Light having passed through the lens unit 40 forms an image on the light receiving surface of the CCD 38. A number of photodiodes (light receiving elements) are arranged in a two-dimensional manner on the light receiving surface of the CCD 38, and primary-color filters of red (R), green (G), and blue (B) are arranged in a predetermined layout (including Bayer and G stripe) so as to correspond to the photodiodes. Further, the CCD 38 has an electronic shutter function of controlling the charge storage time (shutter speed) of each photodiode. The CPU 12 controls the charge storage time in the CCD 38 through a timing generator 50. Instead of the CCD 38, image pickup devices of other systems such as MOS may be used.

A subject image formed on the light receiving surface of the CCD 38 is converted into signal charge according to an amount of incident light by the photodiodes. The signal charge having been accumulated in the photodiodes is read sequentially as a voltage signal (image signal) according to the signal charge based on a driving pulse applied from the timing generator 50 in response to an instruction of the CPU 12.

Signals outputted from the CCD 38 are transmitted to an analog processing section (CDS/AMP) 52 in which RGB signals of each pixel are sampled and held (correlated double sampling) and then amplified. After that, the signals are applied to an AD converter 54. The RGB signals converted into digital signals by the AD converter 54 in a dot sequential manner are stored in the memory 18 through an image input controller 56.

An image signal processing circuit 58 processes the RGB signals, which have been stored in the memory 18, according to an instruction of the CPU 12. In other words, the image signal processing circuit 58 acts as an image processing device which includes a synchronization circuit (processing circuit which interpolates a spatial displacement of a color signal in a color filter arrangement of a single-panel CCD and converts the color signal in a simultaneous manner), a white balance correction circuit, a gamma correction circuit, an edge correction circuit, and a luminance/color difference generation circuit. The image signal processing circuit 58 performs predetermined signal processing according to a command from the CPU 12 while using the memory 18.

RGB image data inputted to the image signal processing circuit 58 is converted into a luminance signal (Y signal) and a color difference signal (Cr and Cb signals) in the image signal processing circuit 58 and is subjected to predetermined processing such as gamma correction. The image data having been processed in the image signal processing circuit 58 is stored in the VRAM 20.

When a photographed image is outputted to the image display 28, the image data is read from the VRAM 20 and transmitted to a video encoder 60 through the bus 14. The video encoder 60 converts the inputted image data into a signal of a predetermined system for display (for example, an NTSC color combined video signal) and outputs the signal to the image display device 28.

In response to the image signal outputted from the CCD 38, image data indicating a single-frame image is rewritten alternately in the A area 22A and the B area 22B. Of the A area 22A and the B area 22B of the VRAM 20, the written image data is read from the area where the image data has not been rewritten. The image data in the VRAM 20 is periodically rewritten thus and the video signal generated from the image data is supplied to the image display 28, so that an image during shooting (corresponding to a photographed image of the present invention) is displayed on the image display 28 in real time. A photographer can confirm a shooting angle of view by viewing an image (through image) displayed on the image display device 28.

When the shutter button 24 is pressed halfway down to turn on the. S1 switch, the camera 10 starts AE and AF processing. In other words, the image signal outputted from the CCD 38 is inputted to an AF detection circuit 62 and an AE/AWB detection circuit 64 through the image input controller 56 after AD conversion.

The AE/AWB detection circuit 64 divides one screen into a plurality of areas (for example, 16×16). The AE/AWB detection circuit 64 includes a circuit for calculating the integrated value of RGB signals for each of the divided areas and provides the CPU 12 with the integrated value. The CPU 12 detects the brightness of a subject (subject brightness) based on the integrated value obtained from the AE/AWB detection circuit 64 and calculates an exposure value (shooting EV) suitable for photographing. And then, an f number and a shutter speed are determined based on the calculated shooting EV and a predetermined program diagram, and the CPU 12 controls the iris and the electronic shutter of the CCD 38 according to the f number and the shutter speed to obtain a proper light exposure.

The AE/AWB detection circuit 64 calculates an average integrated value for each color of the RGB signals in each of the divided areas during automatic white balance adjustment, and the AE/AWB detection circuit 64 provides the CPU 12 with the calculation result. The CPU 12 obtains integrated value R, integrated value B, and integrated value G and calculates ratios of R/G and B/G for each of the divided areas.

The CPU 12 identifies a light source type based on the distribution or the like of the values R/G and B/G in color spaces of RIG and B/G. And then, according to a white balance adjustment value suitable for the identified light source type, for example, the CPU 12 controls a gain value (white balance correction value) for RGB signals of the white balance correction circuit and corrects a signal of each color channel such that each ratio is almost 1 (that is, a ratio of integrated values of RGB is expressed by R:G:B≈1:1:1 on one screen). When adjusting the gain value of the white balance adjustment circuit such that each ratio is a value other than 1, an image with a certain tint can be generated.

In AF control of the digital camera 10, for example, contrast AF is used in which a focusing lens (a moving lens for focus adjustment in a lens optical system making up the photographic lens 42) is moved so as to maximize the high-frequency component of G signal of a video signal. The AF detection circuit 62 is made up of a high-pass filter which permits only the passage of the high-frequency component of G signal, an absolute value processing section, an AF area extraction section which extracts a signal in a focus area predetermined on a screen (for example, at the center of the screen), and an integrating section which integrates absolute value data in an AF area.

The CPU 12 is notified of integrated value data determined by the AF detection circuit 62. The CPU 12 calculates focus evaluation values (AF evaluation values) on a plurality of AF detection points while controlling the lens driving section 46 to move the focusing lens, and the CPU 12 determines, as a focal position, the lens position having the maximum evaluation value. And then, the CPU 12 controls the lens driving section 46 so as to move the focusing lens to the determined focal position. G signal is not always used in the calculation of the AF evaluation values and thus a luminance signal (Y signal) may be used.

When the shutter button 24 is pressed halfway down to turn on the S1 switch, AE/AF processing is performed. Thereafter, when the shutter button 24 is pressed all the way down to turn on the S2 switch, a shooting operation for recording is started. Image data obtained in response to the turn on of the S2 switch is converted into a luminance/color difference signal (Y/C signal) in the image signal processing circuit 58, is subjected to predetermined processing such as gamma correction, and is stored in the memory 18.

The Y/C signal stored in the memory 18 is compressed in a predetermined format by a compression/expansion circuit 66 and is recorded in the recording medium 32 via the medium controller 34. For example, a still image is recorded in JPEG (Joint Photographic Experts Group) format.

When playback mode is selected by the mode selection switch 22, compressed data in the last image file recorded in the recording medium 32 (file recorded last) is read. When the file recorded last is a static image file, the read image compressed data is expanded into an uncompressed YC signal through the compression/expansion circuit 66, converted into a signal for display through the image signal processing circuit 58 and the video encoder 60, and is outputted to the image display device 28. Therefore, the image contents of the file are displayed on the screen of the image display 28.

By operating the right key or the left key of the cross key during the playback of one frame of static image (including the playback of the first frame of a moving image), it is possible to switch files to be reproduced (forward/reverse frame advance). An image file after frame advance is read from the recording medium 32, and a static image or a moving image is reproduced and displayed in the same manner on the image display 28.

Figure 2:
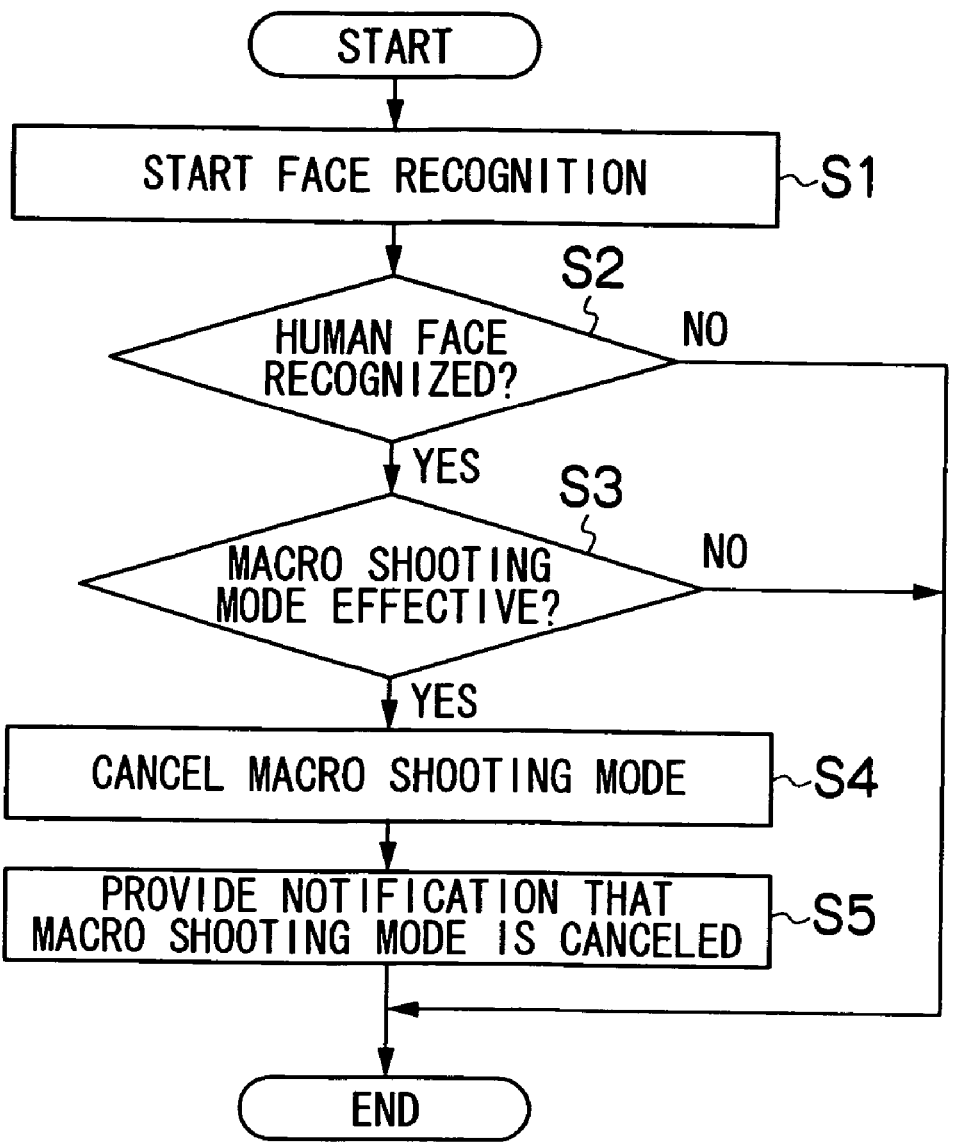
FIG. 2 is a flowchart showing processing for preventing or reducing shooting mistakes in macro shooting mode of the digital camera according to the embodiment of the present invention.

Referring to FIG. 2, the following will describe processing for preventing or reducing shooting mistakes in macro shooting mode of the digital camera 10. FIG. 2 is a flowchart showing the processing for preventing or reducing shooting mistakes in macro shooting mode of the digital camera 10. The following processing is implemented by running a predetermined program by a control unit such as the CPU 12. The program has been read from the ROM 16 or the like into the memory 18 or the like.

In the digital camera 10, when the main power switch is turned on and shooting mode is selected by the mode selection switch 22, face recognition is performed which corresponds to a subject decision device of the present invention (steps S1 and S2). Face recognition is periodically performed in a period during which shooting mode is selected.

Face recognition is processing for deciding whether a human face can be recognized from a photographed image, that is, whether a photographed image includes a subject (a human face in the present embodiment) which cannot be properly photographed in macro shooting mode (step S2).

Various kinds of face recognition are available. For example, whether a photographed image includes a human face or not may be decided by detecting an edge or a pattern from the photographed image (data). Alternatively, whether a photographed image includes a human face or not may be decided by extracting a tint or a skin tone from the photographed image (data). Other known methods of face detection may be also used.

As a result of face recognition, when a human face is recognized from the photographed image (step S2: YES), that is, when it is decided that the photographed image includes a human face, it is decided whether macro shooting mode is effective or not, that is, whether macro shooting mode is selected or not (step S3). This decision corresponds to a macro shooting mode decision device of the present invention. This decision is made by, for example, detecting whether the mark of macro shooting mode (for example, a flower mark) is displayed or not on the display screen of the image display 28.

As a result, when it is decided that macro shooting mode is effective (step S3: YES), that is, when it is decided that macro shooting mode is selected, macro shooting mode is canceled (step S4). This processing corresponds to a macro shooting mode canceling device of the present invention.

Various kinds of cancellation of macro shooting mode are available. For example, a mode other than macro shooting mode (for example, standard shooting mode) may be selected (switching from macro shooting mode to standard shooting mode).

Since standard shooting mode other than macro shooting mode is selected, it is possible to prevent or reducing mistakes of shooting in macro shooting mode a subject (human face) which cannot be properly photographed in macro shooting mode. In other words, it is possible to prevent or reducing shooting mistakes in macro shooting mode. Additionally, when a shooting screen includes a subject which cannot be properly photographed in macro shooting mode (and macro shooting mode is selected), standard shooting mode is immediately selected, enabling quick shooting properly in standard shooting mode. Thus standard shooting mode is selected without missing the best moment to take a good picture.

Alternatively, as cancellation of macro shooting mode, control may be performed such that even when the shutter button 24 is fully pressed, shooting cannot be performed without selection of standard shooting mode (that is, in macro shooting mode).

And then, the user is notified that macro shooting mode is cancelled (step S5). To be specific, the cancellation may be displayed on the display screen of the image display 28.

With this processing, unlike the prior art for measuring a distance to a subject, it is possible to prevent or reducing mistakes of shooting in macro shooting mode a subject (a human face in the present embodiment) which cannot be properly photographed in macro shooting mode. In other words, it is possible to prevent or reduce shooting mistakes in macro shooting mode.

Figure 3:
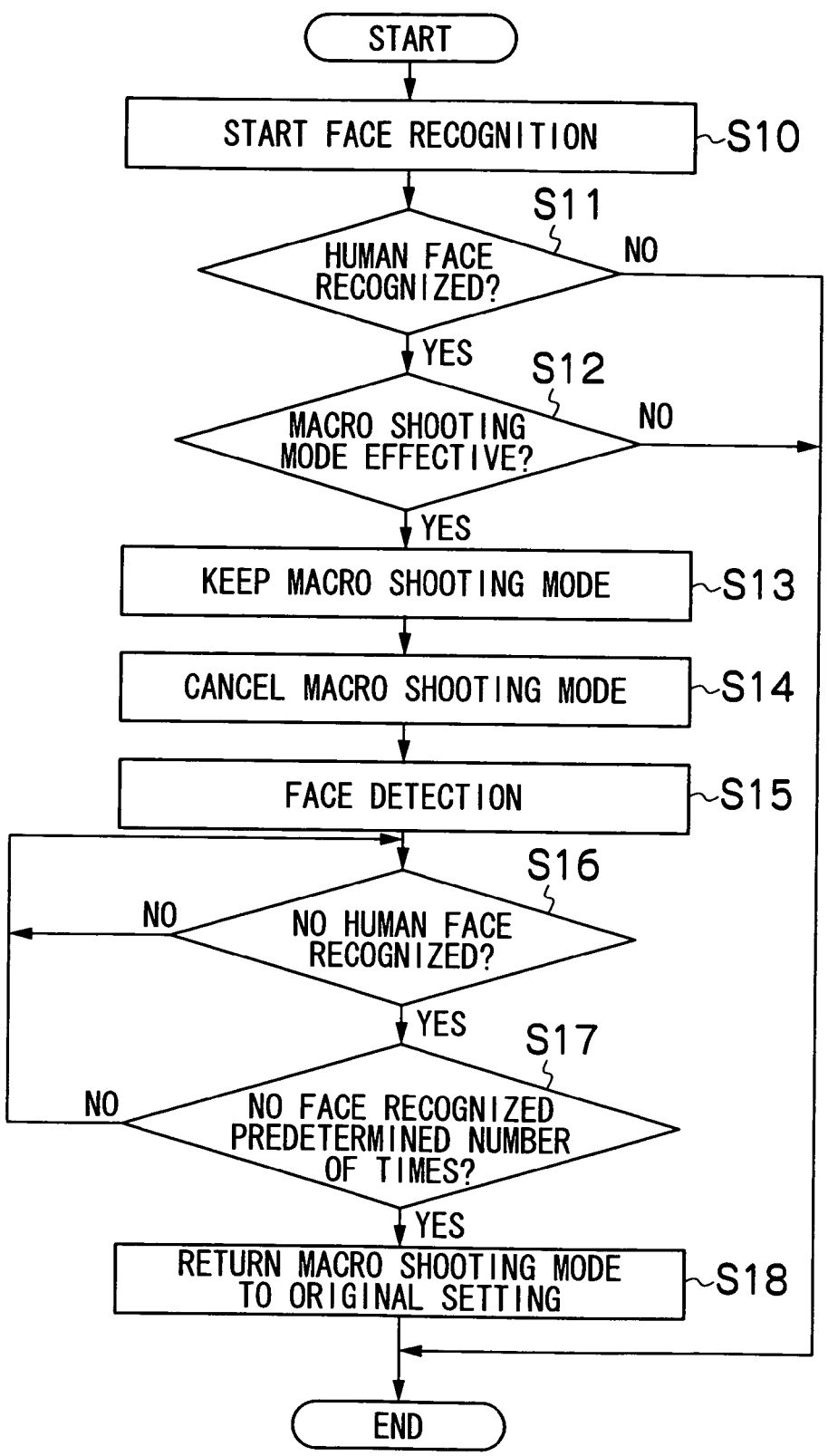
FIG. 3 is a flowchart showing processing for preventing or reducing shooting mistakes in macro shooting mode of a digital camera according to another embodiment of the present invention.

Referring to FIG. 3, the following will describe processing (another embodiment) for preventing or reducing shooting mistakes in macro shooting mode of the digital camera 10. FIG. 3 is a flowchart showing the processing (another embodiment) for preventing or reducing shooting mistakes in macro shooting mode of the digital camera 10. The following processing is implemented by running a predetermined program by a control unit such as the CPU 12. The program has been read from the ROM 16 or the like into the memory 18 or the like.

In the digital camera 10, even after macro shooting mode is cancelled (step S4), face recognition is periodically performed as long as shooting mode is selected (steps S10 and S11). The face recognition is the same as steps S1 and S2 and thus the explanation thereof is omitted.

As a result of face recognition, when a human face is recognized from a photographed image (step S11: YES), that is, when it is decided that a photographed image includes a human face, it is decided whether macro shooting mode is effective or not, that is, whether macro shooting mode is selected or not (step S12). This decision is the same as step S3 and thus the explanation thereof is omitted.

Consequently, when it is decided that macro shooting mode is effective (step S12: YES), that is, it is decided that macro shooting mode is selected, macro shooting mode is kept before macro shooting mode is canceled (step S13). This processing corresponds to a storage device of the present invention. For example, data set in macro shooting mode is stored. With this processing, when returning to macro shooting mode after cancellation of macro shooting mode (step S18), the stored data can be set again. It is thus possible to return to the same conditions as macro shooting mode before cancellation.

After that, macro shooting mode is canceled (step S14). The cancellation of macro shooting mode is the same as step S4 and thus the explanation thereof is omitted. As in step S5, the user may be notified that macro shooting mode has been canceled.

Face recognition is performed at the next time (step S15). As a result of face recognition, when it is decided that no human face is recognized (step S16: YES), that is, it is decided that a photographed image includes no human face and it is decided that a human face is not recognized a predetermined number of times (in the case of two or more times of face recognition) (step S17: YES), processing for returning to the original settings of macro shooting mode is performed, that is, processing for returning to macro shooting mode is performed (step S18). For example, when data set in macro shooting mode has been stored in step S13, the stored data is set again and macro shooting mode is selected (switching from standard shooting mode to macro shooting mode).

Thus it is possible to return to the same conditions as macro shooting mode before cancellation.

As described above, according to the digital camera of the embodiments, it is decided whether the shooting screen includes a subject (human face or the like) which cannot be properly photographed in macro shooting mode (steps S1 and S2). When the shooting screen include a subject which cannot be properly photographed in macro shooting mode (step S2: YES) and macro shooting mode is selected (step S3: YES), macro shooting mode is canceled (step S4). In other words, macro shooting mode is controlled based on an image processing result.

Therefore, unlike the prior art for measuring a distance to a subject, it is possible to prevent or reducing mistakes of shooting in macro shooting mode a subject which cannot be properly photographed in macro shooting mode. In other words, it is possible to prevent or reduce shooting mistakes in macro shooting mode.

In the foregoing embodiments, a subject which cannot be properly photographed in macro shooting mode is a human face. Such a subject is not limited to a human face in the present invention. In short, such a subject may be anything as long as (the user considers that) the subject usually cannot be photographed in macro shooting mode. Therefore, a subject which cannot be properly photographed in macro shooting mode may include a building, an automobile, a train, and an animal.

The foregoing embodiments are just examples in every aspect. The present invention is not limited by the above description and thus can be implemented in other various forms without departing from the spirit or main feature of the present invention.

What is claimed is:

1. A digital camera which has a plurality of modes including shooting mode which enables shooting when the shooting mode is selected in macro shooting mode or other shooting modes, comprising:
    a subject decision device which decides whether a shooting screen includes a subject which cannot be properly photographed in the macro shooting mode based on a shooting screen,
    a macro shooting mode decision device which decides whether the macro shooting mode is selected, and
    a macro shooting mode canceling device which cancels the macro shooting mode when the subject decision device decides that the shooting screen includes a subject which cannot be properly photographed in the macro shooting mode and the macro shooting mode decision device decides that the macro shooting mode is selected,
    wherein the subject decision device decides whether a shooting screen includes a subject which cannot be properly photographed in the macro shooting mode without measuring distance to the subject.

2. The digital camera according to claim 1, wherein the macro shooting mode canceling device selects a mode other than the macro shooting mode when the macro shooting mode is canceled.

3. The digital camera according to claim 1, further comprising: a storage device which stores data having been set in the macro shooting mode before cancellation of the macro shooting mode.

4. The digital camera according to claim 2, further comprising: a storage device which stores data having been set in the macro shooting mode before cancellation of the macro shooting mode.

5. The digital camera according to claim 1, wherein the macro shooting mode canceling device provides notification when the macro shooting mode has been canceled.

6. The digital camera according to claim 2, wherein the macro shooting mode canceling device provides notification when the macro shooting mode has been canceled.

7. The digital camera according to claim 3, wherein the macro shooting mode canceling device provides notification when the macro shooting mode has been canceled.

8. The digital camera according to claim 4, wherein the macro shooting mode canceling device provides notification when the macro shooting mode has been canceled.

9. The digital camera according to claim 2, wherein the mode other than macro shooting mode is standard shooting mode.

10. The digital camera according to claim 3, further comprising: a macro shooting mode returning device which enables a return to the macro shooting mode when it is decided that the shooting screen does not include a subject which cannot be properly photographed in the macro shooting mode after cancellation of the macro shooting mode.

11. The digital camera according to claim 4, further comprising: a macro shooting mode returning device which enables a return to the macro shooting mode when it is decided that the shooting screen does not include a subject which cannot be properly photographed in the macro shooting mode after cancellation of the macro shooting mode.

12. The digital camera according to claim 10, wherein the macro shooting mode returning device sets the stored data and selects the macro shooting mode as a return to the macro shooting mode.

13. The digital camera according to claim 11, wherein the macro shooting mode returning device sets the stored data and selects the macro shooting mode as a return to the macro shooting mode.

14. The digital camera according to claim 1, wherein the subject decision device decides, when the shooting mode is selected, whether the shooting screen includes a subject which cannot be properly photographed in the macro shooting mode.

15. The digital camera according to claim 1, wherein the subject decision device is a face decision device which decides whether the shooting screen includes a human face as a subject which cannot be properly photographed in the macro shooting mode.

16. The digital camera according to claim 1, wherein the subject decision device decides whether the shooting screen includes at least one of a building, an automobile, a train and an animal as a subject which cannot be properly photographed in the macro shooting mode.

* * * * *